C. N. SOWDEN.
SHOCK ABSORBER.
APPLICATION FILED SEPT. 11, 1912.
1,074,658.
Patented Oct. 7, 1913.
2 SHEETS—SHEET 2.
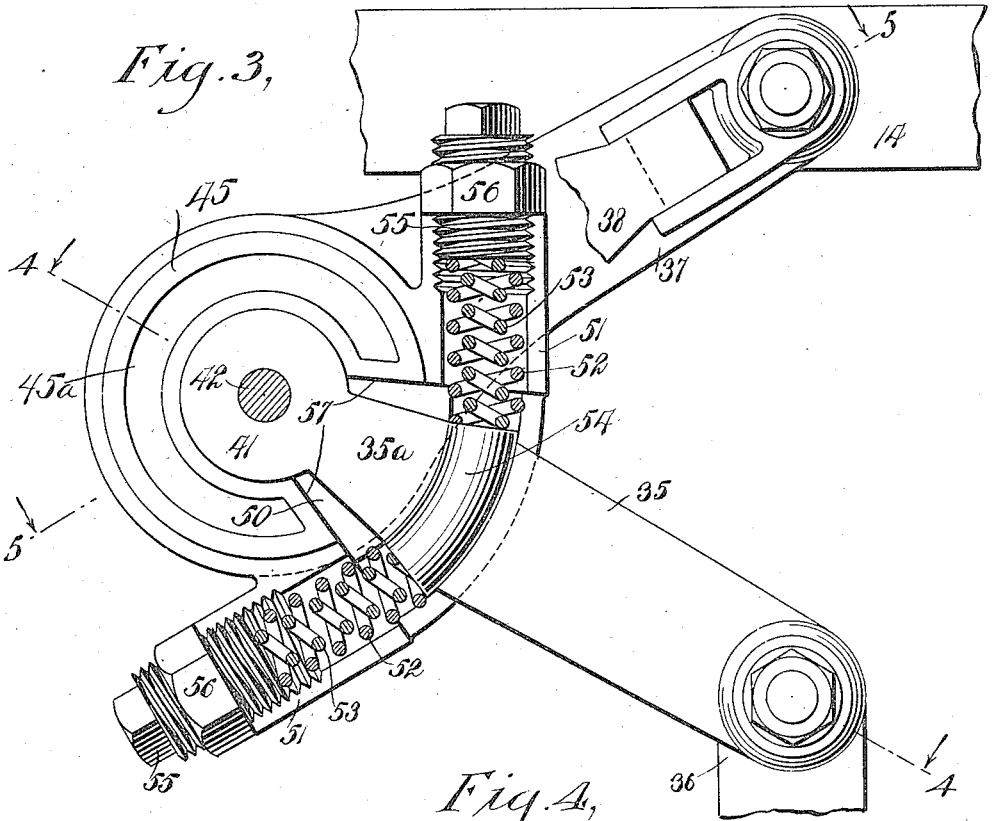
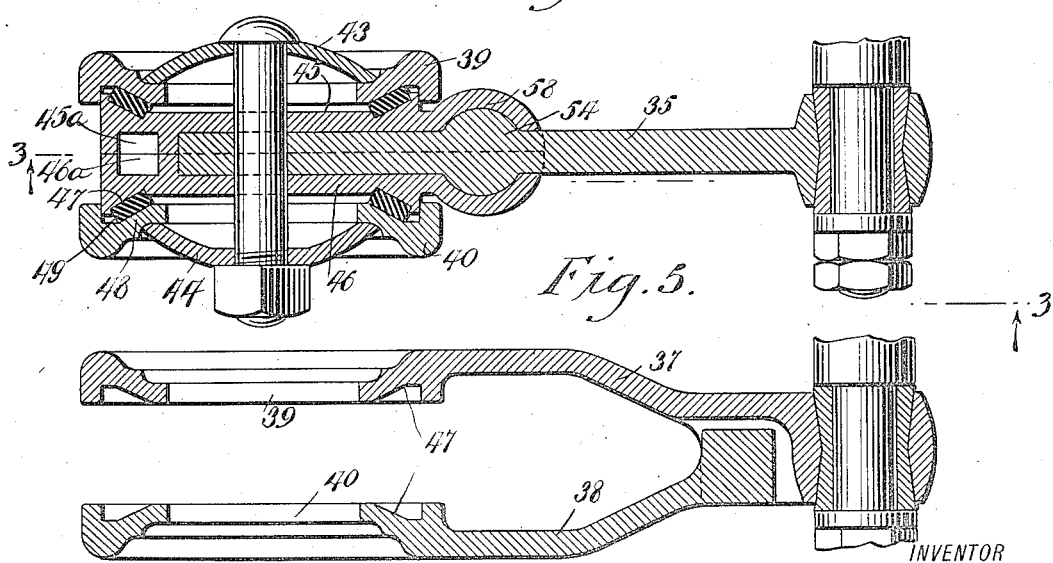
WITNESSES:
Edward Thorpe
INVENTOR
Charles N. Sowden
BY
ATTORNEYS

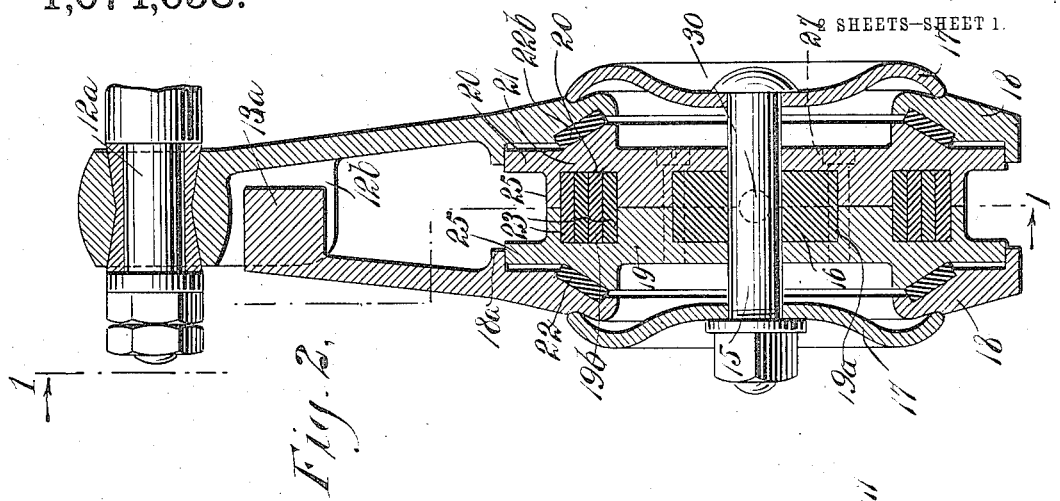

UNITED STATES PATENT OFFICE.

CHARLES N. SOWDEN, OF GUANTÁNAMO, CUBA.

SHOCK-ABSORBER.

1,074,658.
Specification of Letters Patent.
Patented Oct. 7, 1913.

Application filed September 11, 1912. Serial No. 719,739.

*To all whom it may concern:*

Be it known that I, CHARLES N. SOWDEN, a citizen of Canada, at present residing in Guantánamo, Cuba, have invented a new and Improved Shock-Absorber, of which the following is a full, clear, and exact description.

My invention relates to shock absorbers particularly adapted for use on a motor vehicle, and it is a design of the present invention to provide a combined spring and friction shock absorber.

In carrying out the invention I make use of two spring elements combined with friction rings, or their equivalent, and exerting an equal pressure in opposite directions at each side of one of the levers or connecting arms usually employed in this general class of devices, the resistance and elasticity of the spring elements being such that if the lever be moved in one direction sufficiently to compress the spring element in that direction, the spring element on the opposite side of the lever will not be entirely released. The relative arrangement of the spring and friction elements is such that for minor shocks resulting from any small unevenness in the road the spring elements alone will function; and for more severe shocks the resistance of the spring elements will be overcome and the friction elements will function and be moved relatively to each other.

The distinguishing features of my invention, and the important structural elements characterizing the preferred embodiment which is illustrated as an example, will be more particularly explained in the specific description hereinafter to be given.

Reference is to be had to the accompanying drawings forming a part of this specification, in which similar characters of reference indicate corresponding parts in all the views.

Figure 1 is a side elevation of a shock absorber embodying my invention, parts being in section on approximately the lines 1—1 of Fig. 2, the spring being shown in full lines; Fig. 2 is a central vertical section on about the line 2—2 in Fig. 1; Fig. 3 is a side elevation showing a modification, parts being in section on about the line 3—3 of Fig. 4; Fig. 4 is a transverse section on about the line 4—4 of Fig. 3; and Fig. 5 is a fragmentary sectional view of the outer frictional element, the section being taken on about the line 5—5 of Fig. 3.

Referring particularly to the form shown in Figs. 1 and 2, an arm or lever 10 is secured at one end by any suitable device 11 to the axle, or other part of the running gear of the vehicle, and arms 12, 13, (two of which are shown in the present form) are secured to the chassis 14. A bolt 15 passes through the eye 16 of the lever 10, and through disks or their equivalent 17, which bear by their peripheral edges against the outer side of rings 18, which are formed integrally with the arms 12, 13. The rings 18 are spaced from each other and from the eye 16 of the lever 10, and a divided disk is received between the rings 18, being composed of the disk sections 19, 20. These sections 19, 20, are received within annular flanges 18$^a$ on the rings 18, and are recessed at the center, as at 19$^a$, to fit over the eye 16, and provided with external beveled shoulders 21, between which shoulders 21 and the rings 18 are clamped rings 22 of leather or other suitable friction material. The disk sections 19, 20 are formed also with recesses 19$^b$, 20$^b$, in the inner faces thereof to accommodate a laminated spring 23, which spring is in general, of U-form, the U-bend of which is received in the respective recesses in the disk sections. The described recesses in the disk sections are defined at the inside by a sector-shaped rib 24, within which is received the eye 16 of the lever 10, the outer walls of the recesses consisting of an approximately U-shaped rib 25 which is formed on each section 19, 20, the rib 25 being thickened at portions thereof, as at 26, 26$^a$ to receive screws 27, or equivalent devices for fastening the two disk sections 19, 20, together.

The recesses 19$^b$, 20$^b$ are open at one side for the passage of the ends of the laminated spring 23, so that said spring bears frictionally against the lever 10 at opposite sides. As will be clear from Fig. 1, the ends 24$^a$ of the sector-shaped rib 24 are spaced apart a distance greater than the width of the rib of the lever 10 at this point, so that the lever is capable of a limited movement in the direction of either of the legs of the U-shaped spring 23, without contacting with the rib 24. Similarly the outer lamination of the spring 23 is desirably spaced slightly as at 28, from the adjacent wall 29 of each recess 19$^b$, 20$^b$. With this construction, as the lever or arm 10 is moved relatively to the levers or arms 12, 13, in response to the shock, resistance to the relative movement of the arms will be first offered by the spring 23 alone. If the shock is severe and sufficient to overcome the resistance of the spring, the said spring will be moved into contact with that surface 29 toward which the lever 10 is moved, and thus the frictional resistance of the rings 18 and disks 19, 20 with the interposed leather rings 22 will be brought into play.

The springs are in practice intended to have such a tension on the lever 10, that the spring at one side will not be entirely relieved when the lever is moved the extreme distance away from said side, and it is further designed to have the spring of sufficient strength to overcome the maximum resistance of the friction elements without the lever coming into direct contact with the friction elements.

In order to prevent the spring from turning at its U-bend, a set screw 30 may be employed, which takes into the thickened portion 26ª of the disk sections 19, 20, the end of the set screw being adapted to turn against the outer surface of the outer lamination of the spring.

It will be observed from Fig. 1, that as the lever 10 moves in either direction from the central position, the points of contact between the spring and the lever will shift, thus increasing the stiffness of the spring on the side toward which the lever moves, and increasing the elasticity of the spring on the other side of the lever. The shifting of the points of contact between the spring and the lever depends to a large extent on the shape of the spring and the angle at which the spring approaches the lever.

In the described form of my invention the mentioned clip 11 is secured to the lever 10 by a bolt 11ª, and the arm 12 is secured to the chassis 14 by a bolt 12ª, the said arm 12 being formed with spaced cheeks 12ᵇ that receive a projection 13ª on the lever 13.

Referring to Figs. 3 to 5 of the drawings, a lever 35 is connected in any suitable manner, as by a clip 36, to the axle (not shown) and the arms 37, 38 are connected with the chassis 14 in the same manner as the arms 12 and 13. The arms 37, 38 are formed with friction rings 39, 40, and the lever 35 has a central disk or eye 41 that receives the bolt 42 which passes through clamp disks 43, 44, through the open centers of the rings 39, 40, and through the disk sections 45, 46, which receive between them the central disk 41 of the lever 35. Each disk section 45, 46, may have a recess 45ª, 46ª to give lightness. Externally the friction disks 45, 46, have outwardly flaring shoulders 47, and similar shoulders 48 are formed on the interior surfaces of the rings 39, 40. Rings 49 of leather or other frictional material are preferably employed between the shoulders 47, 48.

The lever 35 is capable of a limited movement in either direction from the central position toward or from the levers 37, 38, without bringing the described friction elements into play, and to this end the disks 45, 46, are so formed as to provide an opening 50 through which the lever 35 passes, the said lever at the portion 35ª that passes through the opening 50 being of less width than the said opening, so that it will move relatively to said disks and relatively to the levers 37, 38, without moving the friction elements. An initial resistance is offered by spiral springs at each side of the lever and abutting against the same and against the friction disk sections 45, 46. Thus the said disk sections have substantially tangential pockets 51, one at each side of the opening 50 through which the lever 35 passes, and the spiral springs are received in said pockets, there being preferably in each pocket an outer spring 52 and an inner spring 53. Said springs at one end abut against the ends of a circular enlargement 54 on the lever 35, and abut at their outer ends against threaded plugs 55 that take into the outer ends of the pockets 51. Set nuts 56 may be employed whereby the threaded plugs 55 may be adjusted to put the springs under greater or less tension. Between the pockets 51 the disk sections 45, 46 are formed with concavo-convex members 58, that receive the rounded enlargement 54 of the lever 35. The relative resistance offered by the friction elements and the springs is such that the friction will resist the minor shocks while the springs will yield to said shocks. Under a severe shock, however, the resistance offered by the springs will be such as to overcome the frictional resistance before the lever reaches a wall 57 of the opening 50; thus under severe shocks, the disks 45, 46, will be moved relatively to the friction rings 39, 40, thus bringing the frictional resistance into play.

Having thus described my invention, I claim as new and desire to secure by Letters Patent:—

1. A shock absorber, comprising rotary friction elements, pivoted arms mounting the friction elements, the pivoted arms having friction surfaces relatively to which the rotary friction elements are movable, said elements and the pivoted arms having a common center of movement, and spring means interposed between the one arm and one of the friction elements, said spring means initially receiving the shock and adapted to yield, without the friction elements functioning, during initial movements of the arms relatively to each other.

2. In a shock absorber, arms pivoted on a common center and having ends adapted for connection with relatively movable parts of a vehicle, a friction element around the pivotal center of the arms and adapted for turning movements relatively to both the arms, and spring means bearing at opposite sides of one arm, the mentioned friction element having members with which the spring means have engagement.

3. In a shock absorber, pivoted arms movable relatively to each other, a friction element on one of said arms around the pivot, an interposed rotary friction element between said arms and co-acting with the said first mentioned arm, and spring means acting on one of said arms and on the said rotary interposed element, said last mentioned arm being movable against the resistance of the spring means toward the interposed element under initial shocks, and the said last mentioned arm and interposed element moving jointly under excessive shocks relatively to the first mentioned arm and its friction element.

4. A shock absorber, comprising a pair of arms having friction rings and means for mounting the arms to move in unison, a third arm between the pair of arms, friction disk sections arranged respectively between the third arm and each arm of the pair, the said disk sections being capable of movement relatively to the pair of arms, and the third arm being movable relatively to the pair of arms and to the disk sections, and spring means at opposite sides of the said arm and opposing its movement in either direction, said spring means resisting severe shocks to cause a movement of the disk sections relatively to the friction rings on the pair of arms.

5. A shock absorber, comprising an arm having a friction element, a second friction element movable relatively to the first one, an arm movable relatively to the first arm and relatively to the second friction element, and spring means having elongated members bearing frictionally near the ends thereof against opposite sides of the second mentioned arm and disposed at an angle thereto, the spring members yielding to a movement of the arm against which they bear without movement of the friction elements, and the said spring members, the arm against which they bear, and the second friction element being movable in unison relatively to the first mentioned friction element under severe shocks.

6. In a shock absorber, arms pivoted to move toward and from each other and adapted for connection with relatively movable parts of a vehicle, a friction element disposed around the pivotal center of the arms, spring means bearing against one arm at opposite sides thereof, said friction element having members against which the opposite ends of the springs abut, the arms being capable of relative movement against the tension of the springs in response to initial shocks without actuating the friction element, and one of the arms being movable into direct contact with the said friction element upon excessive movement of the said arm in either direction.

7. A shock absorber, comprising a pair of arms pivoted together to move toward and from each other, a friction element mounted to turn relatively to one of said arms and in frictional engagement therewith, the other arm being capable of a limited turning movement relatively to the mentioned friction element, and capable of a turning movement relatively to the other arm, and spring means interposed between the friction element and the other arm and movable by the said arm under excessive movement thereof, the spring means yielding to initial movement of the last mentioned arm in either direction.

In testimony whereof I have signed my name to this specification in the presence of two subscribing witnesses.

CHARLES N. SOWDEN.

Witnesses:
H. C. MORGAN,
C. F. FERRER.